United States Patent [19]

Ballard et al.

[11] 3,988,509
[45] Oct. 26, 1976

[54] REDUCED MELT INDEX, LOW GEL CONTENT ETHYLENE COPOLYMERS AND PROCESS FOR PREPARATION THEREOF

[75] Inventors: Edward Cooper Ballard; John Ricks Priest, both of Wilmington, Del.

[73] Assignee: E. I. Du Pont de Nemours and Company, Wilmington, Del.

[22] Filed: Apr. 10, 1975

[21] Appl. No.: 567,017

Related U.S. Application Data

[60] Division of Ser. No. 349,484, April 9, 1973, Pat. No. 3,884,857, which is a continuation-in-part of Ser. No. 143,311, May 14, 1971, abandoned.

[52] U.S. Cl. .............................. 528/491; 526/329; 528/501; 526/11.1; 260/63 CQ
[51] Int. Cl.² ...................................... C08F 220/12
[58] Field of Search ............. 260/86.7, 87.3, 94.9 F

[56] References Cited
UNITED STATES PATENTS

| | | | |
|---|---|---|---|
| 2,953,551 | 9/1960 | White | 260/86.7 |
| 3,030,322 | 4/1962 | Schrader | 260/28.5 A |
| 3,048,553 | 8/1962 | Moss | 260/87.3 |
| 3,157,628 | 11/1964 | Hill | 260/94.9 R |
| 3,215,657 | 11/1965 | Beresniewicz | 260/28.5 AV |
| 3,485,784 | 12/1969 | Waples | 260/86.7 |
| 3,534,009 | 10/1970 | Beresniewicz | 260/87.3 |

*Primary Examiner*—Paul R. Michl

[57] ABSTRACT

Continuous process for the production of reduced melt index, low gel content ethylene copolymers comprising the in-line addition of a solution of a free radical initiator into the polymer stream under turbulent conditions after most but not all of the unreacted monomers have been removed. The reduced melt index, low gel content ethylene copolymers prepared by the above process are particularly useful in coating compositions for paper, paperboard or corrugated board.

14 Claims, 1 Drawing Figure

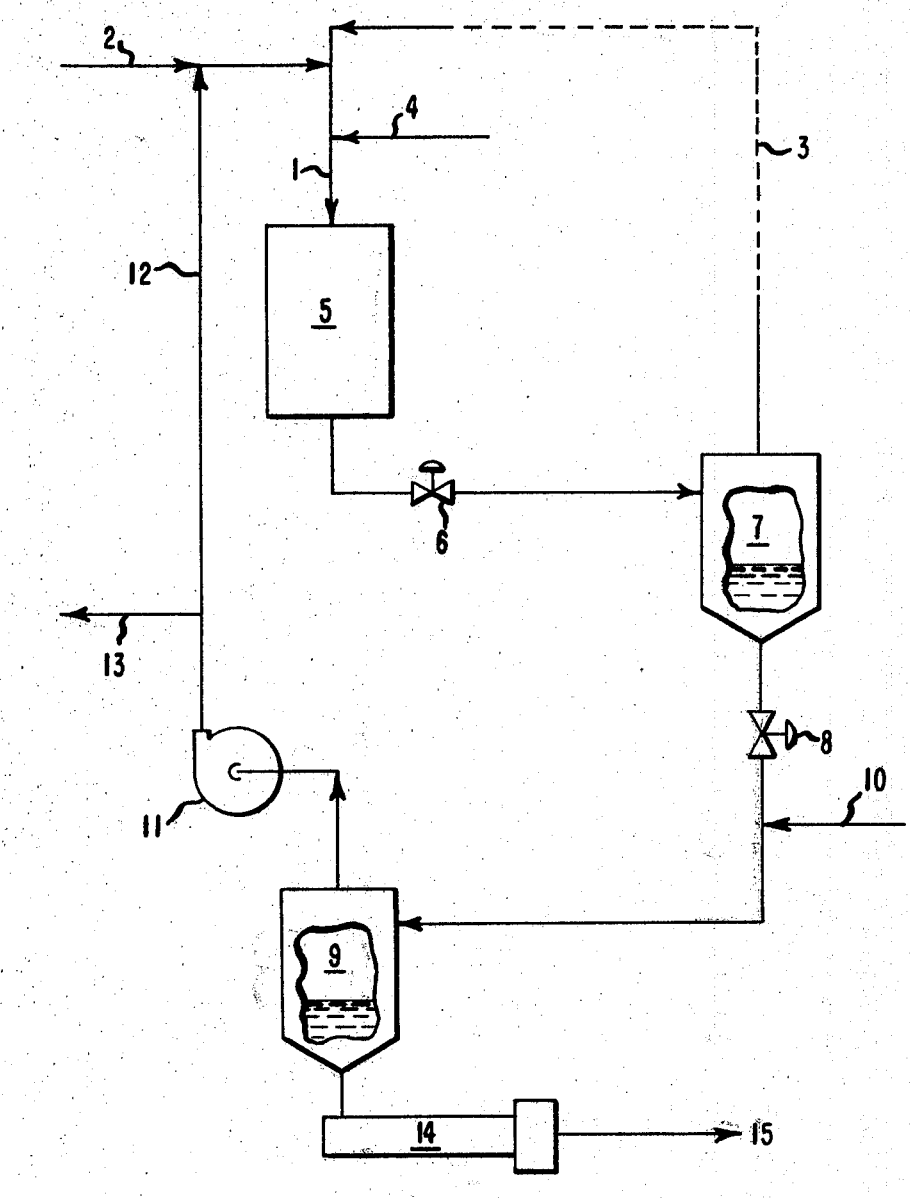

REDUCED MELT INDEX, LOW GEL CONTENT ETHYLENE COPOLYMERS AND PROCESS FOR PREPARATION THEREOF

CROSS-REFERENCE TO RELATED APPLICATIONS

This application is a division of copending application Ser. No. 349,484, filed Apr. 9, 1973, now U.S. Pat. No. 3,884,857 which is a continuation-in-part of application Ser. No. 143,311, filed May 14, 1971, now abandoned.

BACKGROUND OF THE INVENTION

1. Field of the Invention

This invention relates to ethylene copolymers and more particularly, it relates to the manufacture of reduced melt index, low gel content ethylene copolymers.

2. Description of the Prior Art

Gel (insoluble polymer particles) has long been recognized as an undesirable contaminant in ethylene copolymers produced in free radical-initiated high pressure polymerizations. In appearance it varies from small particles, called "micro" gel or "background" gel to relatively large particles called "fisheye" or "lens" gel.

Gel is undesirably overpolymerized (very high molecular weight), or crosslinked, polymer not soluble in the bulk of the product at the temperatures which are normally encountered in processing and using the polymer. Gel detracts from the appearance of films prepared from essentially 100% polymer systems. It also affects adversely the appearance and ease of application of hot melt and solvent based formulations containing ethylene copolymers when these formulations are used to coat packaging substrates such as paper, paperboard, and corrugated board as well as finishing furniture, etc. Gel present in the polymer also appears to serve as the nucleus for the development of larger gel particles when ethylene copolymer-based formulations are held molten during blend preparation and application.

A number of solutions have been suggested to at least partially overcome these disadvantages. Polymer can be treated in high shear mixers to break down the gel. Polymer can be forced through fine mesh screens to filter out gel and/or break the gel into smaller particles so that it becomes less harmful. It is stated in U.S. Pat. No. 3,157,628 that, in a high-pressure tubular reactor, a small amount (0.05 to 0.20% based on the weight of the polyethylene produced) of an A-stage paratertiaryalkylphenol-formaldehyde resin can be injected into the last half of the elongated reaction zone to decrease the number of fisheyes and lenses present in films made from the polymer. The above patent further states that many products, such as di-tertiarybutyl-para-cresol (BHT), which are known to be free radical traps at lower temperatures, are not effective under the conditions covered by the patent.

SUMMARY OF THE INVENTION

According to the present invention there is provided in a continuous, high-pressure, free radical polymerization process for preparing ethylene copolymers having reduced melt index and gel content comprising (a) introducing ethylene and at least one monomer selected from the group consisting of vinyl esters of $C_1$ to $C_4$ monobasic aliphatic acids, acrylates and methacrylates wherein the alcohol moiety is derived from aliphatic $C_1$ to $C_4$ monohydroxy alcohols, acrylic acid, methacrylic acid, maleic acid, and maleic anhydride, provided that at least 75 mol percent of the monomers is ethylene and sufficient amount of said vinyl ester, acrylate or methacrylate monomer is introduced to yield at least about 5 weight percent of units derived from said monomer in the resulting copolymer, and an initiator into the reactor, (b) maintaining the monomers and initiator in contact in the reactor at a temperature of about 100° C.–250° C. and a pressure of about 1000–2500 atmospheres until the desired extent of conversion to ethylene polymers has been obtained, (c) removing the reaction mixture from the reactor, (d) reducing the pressure by first pressure letdown means such that the reaction mixture enters a first separator at about 100–400 atmospheres, (e) separating out from the reaction mixture in a first separator about 90–97% of the unreacted monomers, (f) further reducing the pressure by second pressure letdown means such that the reaction mixture enters a second separator at about 0–5 atmospheres above ambient, and (g) separating out from the reaction mixture in a second separator substantially all of the remaining 3–10% by weight of unreacted monomers, the improvement in this process comprising the in-line addition of a solution of a free radical initiator in a suitable solvent which is soluble in the copolymer and is not harmful to the crosslinking reaction to said ethylene copolymer reaction mixture after the pressure has been reduced to below about 250 atmospheres and after at least about 90% by weight, but not more than about 97% by weight, of the unreacted monomers have been separated out from the reaction mixture, thereby producing an at least about 50% reduction in the melt index of said ethylene copolymer.

In the context of the present invention the phrase "reduced gel content" means that polymer made by the improved processes of this invention has fewer gel particles than found in control polymers of the same melt index made by direct synthesis without free radical initiator treatment.

BRIEF DESCRIPTION OF THE DRAWING

The FIGURE is a schematic illustration of the process of the present invention.

DESCRIPTION OF THE PREFERRED EMBODIMENTS

It has been found that the present invention offers a method to produce low melt index (MI) polymers with a lower gel content than is possible to attain by direct synthesis. Polymers produced by direct synthesis tend to show increased gel contents as their MI goes down (molecular weight goes up). However, in the course of the process of the present invention, gel levels stay reasonably constant in the polymer as the average molecular weight of the polymer is increased by the mild crosslinking reaction. The MI of the copolymer is reduced by at least about 50% by the in-line addition of a free radical initiator to the ethylene copolymer mixture. Preferably, the MI of the resulting copolymer is about 0.1 to 100. In the most preferred embodiments the resulting copolymer will have a MI of about 0.5 to 50.

The ethylene polymers employed in the present invention are copolymers of ethylene with one or more copolymerizable monomer. They are those used in wax-based formulations as barrier coatings, heat seal coatings and adhesives. They are all produced under similar conditions and all have recognizable and, for use in many applications, undesirable gel content. Many ethylene-based copolymers containing vinyl esters or methacrylates or acrylates, both with and without additional comonomers such as acrylic, methacrylic or maleic acid or maleic anhydride, have been tested as flexibilizing polymers for wax systems and as plasticizers for hard resins such as nitrocellulose and many of them are in large scale commercial use. Thus suitable ethylene copolymers are those containing at least about 5% by weight of vinyl esters of $C_1$ to $C_4$ monobasic aliphatic acids and acrylates and methacrylates wherein the alcohol moiety is derived from aliphatic $C_1$ to $C_4$ monohydroxy alcohols. Copolymers of this type can also be produced containing acidic groups (e.g., about 0.01–10% by weight) such as the ones derived from acrylic acid, methacrylic acid, maleic acid or maleic anhydride. These are described in U.S. Pat. No. 3,215,678 and U.S. Pat. No. 3,215,657. The copolymers can contain added carbonyl groups by the inclusion of carbon monoxide (CO) as a comonomer (such as E/VA/CO copolymers). These terpolymers should contain at least about 40% by weight ethylene, up to about 60% by weight vinyl acetate, and up to about 30% by weight carbon monoxide. Preferably, the E/VA/CO terpolymers contain at least about 40% by weight ethylene, from about 15 to about 45% by weight vinyl acetate and from about 2 to about 25% by weight carbon monoxide.

The MI of the polymer employed is not critical. The lower limit is established by ease of processability during manufacture, i.e., the characteristics of the polymer to readily flow through the equipment. At a high MI, about 1000 or so, the gel content of the polymers prepared by direct synthesis is not as high as at lower melt indices. The most serious gel problem is posed with lower MI polymers and accordingly, the process of the present invention can be used to best advantage with polymers having a reduced MI of about 0.1 to 100.

The description to follow will be in the context of the manufacture of ethylene copolymers, especially ethylene/vinyl acetate copolymers.

A typical high-pressure, stirred reactor, free radical-initiated, continuous polymerization process in which the benefits of the present invention can be realized is illustrated in the FIGURE. Feed stream 1 consists essentially of about 5–20 weight percent (preferably about 10–15 weight percent) of fresh monomer makeup stream 2, about 80–95 weight percent of recycled unreacted monomer streams 3 and 12 and initiator stream 4. Monomer makeup stream 2 is a mixture of ethylene with one or more copolymerizable monomers (such as vinyl acetate) and accordingly, unreacted monomer stream 3 will contain ethylene and unreacted comonomer. Initiator stream 4, comprising a solution of a conventional reaction initiator (such as dialkyl peroxydicarbonates, t-butyl peracetate, t-butyl peroxypivalate) suitable for the temperature at which the polymerization is being run, is injected into the feed stream at the entrance to reactor 5. Feed stream 1 enters reactor 5 at a temperature substantially lower (usually 100° C. or more below reaction temperature) than that at which the polymerization is run. Usual feed temperatures are in the range of about 0° C.–60° C. The feed stream is introduced into the reactor at about 1000–2500 atmospheres, preferably about 1300–2000 atmospheres, pressure.

Conversion of 5 to 15 weight percent of the monomers in the feed stream takes place in the reactor. The heat liberated in the polymerization raises the temperature of the feed stream to the desired reaction temperature, generally about 100° C.–250° C., preferably 120° C.–210° C. The reaction mixture, consisting essentially of a single phase with the polymer dissolved in unreacted ethylene and comonomers, passes through a let-down valve 6 wherein the pressure is reduced such that the reaction mixture enters first separator 7 at about 100–400 atmospheres, preferably about 150–200 atmospheres where the single phase which was present at reactor pressures separates into a major gaseous phase of unreacted ethylene and comonomers, and a second, impure molten polymer phase consisting primarily of polymer but containing some dissolved monomeric ethylene and comonomers. This impure molten polymer discharges from the bottom of first separator 7, passes through a second let-down valve 8 wherein the pressure is reduced (to between about 10 and 50 atmospheres) such that the reaction mixture enters second separator 9 at a gage pressure (above ambient) of about 0–5 atmospheres, preferably about 1–3 atmospheres. While it is flowing through the line between second let-down valve 8 and second separator 9, it is in a very turbulent condition because it is passing through a relatively small diameter pipe, and the monomeric ethylene and comonomers which were dissolved in the product under the conditions prevailing in first separator 7 are flashing into a gaseous phase.

The free radical initiator, or if preferred for safety or convenience reasons, a solution thereof in, e.g., mineral spirits or in one of the other suitable solvents discussed below, is injected at a controlled but variable rate into the solvent stream in line 10. Flow conditions are such that excellent mixing of the free radical initiator and solvent streams occurs before the resulting solution contacts the polymer flowing from the first to the second separator.

The injection of the free radical solution can be achieved by a positive displacement pump capable of output pressures exceeding those in the line between the two separators. In some cases it may be desirable to inject the initiator solution at two or more locations. In some cases to achieve good mixing of the thin initiator solution and the viscous polymer melt when putting large amounts of solution into the blend, it may be desirable to use a baffled mixing zone in the pipe between second let-down valve 8 and second separator 9. It is preferred to introduce the initiator solution between second let-down valve 8 and second separator 9. The initiator solution can also be introduced between first separator 7 and second let-down valve 8, or into second separator 9. In this latter case it would be advantageous to select an initiator with a longer half-life, perhaps combined with maintaining a higher temperature in the second separator 9, as well as designing some mixing system into second separator 9 by which the low viscosity initiator solution could be rapidly dissolved and uniformly blended into the high viscosity molten polymer.

Approximately 90–97 weight percent, preferably at least 95 weight percent, of the unreacted ethylene and comonomers separate from the polymer phase in first separator 7 and are recycled without coming in direct contact with the solvent being added to the system.

Substantially all of the remaining about 3–10 weight percent of unreacted monomers are removed from the crude polymer stream in second separator 9. Thus, the solvent mixing with the crude polymer stream only contacts about 3–10 weight percent, preferably 3–5 weight percent, of the unreacted monomers. Furthermore, these monomers are at low pressure and thus do not carry a significant amount of the solvent (in vapor form) back into reactor 5. A portion of these unreacted monomers, after their pressure has been increased in compressor 11 to about 20–50 atmospheres, can be recycled to reactor 5 after further compression, as minor recycle stream 12, whereas the rest leaves the system as purge gas stream 13. This avoidance of major contact between the recycle monomers and the solvent is an important part of the present process and is necessary for continuous production of uniform polymers.

After the unreacted monomers have been removed to the desired extent in second separator 9 the molten polymer flows into melt cutter 14 where the polymer is extruded through suitable dies and is cut under water into approximately ⅛ inch diameter spheroids. The solidified polymer pellets are air transported to blending bins and, after blending, and purging of residual monomers, are packaged.

Thus the injection of the free radical initiator solution into the polymer reaction mixture occurs after the pressure has been reduced to below 250 atmospheres and after at least about 90% by weight, but not more than about 97% by weight of the unreacted monomers have been separated out of the reaction mixture. The free radical initiator is selected such that its half life at the temperature within the second separator is approximately 60 seconds.

During the normal 10–20 minute hold-up time in the second separator the source of free radical is essentially all decomposed. The free radicals generated by its decomposition promote crosslinking of the polymer in the reaction mixture, the extent of the crosslinking being controlled by the concentration of the free radical initiator. Using this process the MI of the ethylene copolymer can be reduced by at least about 50% beyond the value that would be obtained under the same reactor and feed conditions by direct synthesis only. For example, it is possible to in-line convert an ethylene/vinyl acetate copolymer synthesized at approximately 6 MI into mildly crosslinked polymers with melt indexes, based on 100% polymer, ranging down to well under 1 and probably well under 0.1. The limits of MI reduction are governed by the ability of the mildly crosslinked polymer to flow through the low-pressure separator so it can be extruded, melt cut, and discharged from the continuous process.

The solvent for the free radical initiator is selected such as to be soluble in the copolymer, not harmful to the crosslinking reaction and not harmful to the ultimate polymer use. Solvents such as dioctyl phthalate and other stable esters, aromatic hydrocarbons such as xylenes, toluene or benzene, mineral spirits, cyclohexane, and even monomeric vinyl acetate can be used. Polymers being crosslinked using non-wax carriers for the crosslinking agent can be of higher vinyl acetate content, such as those in the range of 30–50% vinyl acetate, as well as those in the range of 5–35% vinyl acetate where wax could be used more readily as the carrier for the crosslinking agent. In order to obtain copolymers with as high as 50% vinyl acetate (or other vinyl ester, acrylate or methacrylate) at least about 75 mol percent of the monomers introduced into the reactor should be ethylene.

The minimum amount of solvent to be introduced is selected such as to be sufficient for the efficient blending of the free radical initiator in the copolymer stream. This decreases localized concentrations of free radicals and thereby avoids excessive formation of secondary gel in the polymer. As low as about 1%, or even as low as about 0.25% of solvent, based upon the weight of the copolymer, can be employed, and generally about 5 to 20% by weight of solvent is preferred. Solvent carried with the gas exiting from the second separator can be recovered by well known solvent recovery procedures. Accordingly, the upper limit on the amount of solvent introduced into the copolymer reaction mixture is not critical but is controlled only by routine, practical considerations, such as the extent of solvent recovery one would be willing to undertake, avoidance of undue dilution or cooling of the reaction mixture.

When injecting 10 weight percent solvent into the polymer, the concentration of the free radical initiator in the solvent contacting the polymer will usually be in the range of 0.05 to 2.0 weight percent. This corresponds to 0.005–0.200 weight percent (or 50 to 2000 parts per million) of free radical initiator, based on the polymer being modified. The concentration of the free radical initiator is selected so as to attain the desired MI in the crosslinked polymer. In the case of some inefficient crosslinking agents it may be necessary to go even as high as 5000 ppm to achieve the desired MI reduction. The specific free radical initiator to be used is determined by the temperature of the polymer stream entering the second separator and by the hold-up time in the second separator. The hold-up time should be at least about five times the half life of the free radical initiator at the given temperature. It is generally desirable to have the half life of the free radical initiator in the range of 10–150 seconds, preferably 30–90 seconds, at this temperature. Temperatures encountered in the second separator while producing the ethylene copolymers covered by this invention are in the range of 100° C. to 200° C., usually 130°–170° C., depending on the MI and comonomer content of the polymer being produced. Free radical initiators suitable for use in this invention cover typical organic peroxide catalysts such as di(2-ethylhexyl) peroxydicarbonate, di(-sec.-butyl) peroxydicarbonate, diisopropyl peroxydicarbonate, t-butyl peroxypivalate, 1,1,3,3-tetramethylbutyl peroxy-2-ethylhexanoate, 2,5-dimethyl-2,5-bis (2-ethylhexanoylperoxy) hexane, t-butyl peroctoate, t-butyl peroxyisobutyrate, t-butyl-peroxy isopropyl carbonate, t-butyl peracetate, methyl ethyl ketone peroxides, t-butyl perbenzoate, 2,5-dimethyl-2,5-bis (t-butyl-peroxy) hexane, di-t-butyl peroxide, 2,5-dimethyl-2,5-bis (t-butylperoxy) hexyne-3, 2,4-pentanedione peroxide. This invention is not limited to peroxide-crosslinking agents but includes other sources of free radicals such as liquid azonitriles (or those soluble in suitable organic solvents) and which have half lives as defined above. "Azo DA-82," manufactured by Lucidol Division of Pennwalt Chemicals, is an example of such an azonitrile.

Ethylene/vinyl acetate, ethylene/acrylic ester copolymers and related products which may contain other neutral or acidic comonomers have many uses. They are used commercially as 100% polymers or, at 5 to 40 weight percent concentrations, in blends based on petroleum wax with or without additional components (such as rosin derivatives, pinene, styrene, substituted styrene, and aliphatic olefin-based resins) as coatings on flexible packaging materials, corrugated board, chip board, wood and metal objects. The coatings furnish water resistance and/or heat-sealing properties to the base materials. They are also used, generally at higher concentrations (15–50 weight percent) in formulations with secondary resins such as mentioned above to form pressure-sensitive or heat seal adhesives. Here applications include labels, bookbinding, industrial adhesives, etc. The improved products of this invention can be used in all of these and many other applications but are particularly useful in coatings applied to clear films where the gel particles become obvious imperfections in the film. They are also desirable when the formulations are applied via curtain coating where the gel particles can contribute to curtain breaks and associated coating imperfections. Those containing relatively higher amounts of vinyl acetate or acrylic ester are also used as flexibilizing or plasticizing agents in other polymers, such as polyvinyl chloride, and in solvent systems in the manufacture of printing inks and lacquers. Gel particles present in the original polymer can promote larger gel particle formation during the preparation of blends, and to the extent this occurs, the improved low gel polymers are desirable in all applications.

The present invention is further illustrated by the following example wherein all parts and percentages are by weight, except where noted otherwise.

EXAMPLE

A reduced MI, ethylene/vinyl acetate (EVA) copolymer (27 weight percent vinyl acetate) was produced in plant scale equipment using the high-pressure, free radical-initiated ethylene copolymerization system illustrated in the FIGURE. Under the conditions of this experimental run, which produced the base polymer at 1,000 parts/hour, approximately 8080 parts/hour of a recycle stream 3 of ethylene and vinyl acetate monomer was separated from the crude polymer stream in first separator 7. This gas stream left the separator at a pressure of approximately 170 atmospheres and 185° C. It was compressed to 1700 atmospheres, cooled to 35° C., and recycled to polymerization reactor 5. Prior to entering the reactor, it was mixed with fresh ethylene and vinyl acetate stream 2 of approximately 1,240 parts/hour and small recycle stream 12 of approximately 240 parts/hour of mixed ethylene and vinyl acetate. This latter stream was a portion of the gas recovered from the second separator 9. The rest of the gas (approximately 240 parts/hour) recovered from the second separator was, after partial compression in 11, bypassed from the system for purification before reuse.

The combined fresh and recycle monomer streams were mixed with initiator stream 4 just at the entrance to the reactor. Approximately 1 part of the initiator (t-butyl peroctoate) was fed to the unit per hour. Reaction took place at 170° C. and 1700 atmospheres pressure. Approximately 11 weight percent of the monomeric reactants fed to reactor 5 were converted into polymer during their residence in the reactor. The reaction mixture was discharged from the reactor at 1700 atmospheres pressure, and passed through letdown valve 6 into first separator 7 controlled at 170 atmospheres. The unreacted monomers flash vaporized from the crude polymer and were recycled as described above. The crude polymer stream containing some dissolved monomeric ethylene and vinyl acetate passed through second letdown valve 8 and entered second separator 9 at two atmospheres pressure. The overhead gas from 9 (approximately 480 parts/hour) was compressed to about 40 atmospheres pressure and split between recycle and venting as described above. The polymer from second separator 9 was discharged through the extruder-melt cutter 14 for final processing.

In this mild crosslinking experiment the free radical initiator solution 10 (a 6.5 weight percent solution of t-butyl peroctoate in odorless mineral spirits) was continuously injected at the specified rates into the line between letdown valve 8 and second separator 9. The estimated pressure in this line at the point of peroxide injection was between 10 and 20 atmospheres. To aid in mixing the peroxide with the polymer the peroxide solution was injected through a small orifice such that several hundred pounds pressure drop was taken in the peroxide solution line at the point of injection. The temperature in the second separator was approximately 145° C., corresponding to a 20–25 second half life for the initiator. Average holdup time in this separator was 10–20 minutes, during which time the peroxide decomposed and initiated the reduction in the polymer MI.

Data from this plant scale experiment are given in the following Table.

TABLE

| Production Time into the Example, hours | t-butyl peroctoate solution added, parts/1000 parts polymer* | t-butyl peroctoate added, parts/1000 parts polymer | t-butyl peroctoate added, ppm based on polymer | Polymer Melt Index** |
| --- | --- | --- | --- | --- |
| 0:00 | 0 | 0 | 0 | — |
| 0:30 | 0 | 0 | 0 | 138 |
| 1:30 | 0 | 0 | 0 | 141 |
| 1:45 | 2.8 | 0.18 | 180 | — |
| 2:00 | 2.8 | 0.18 | 180 | 127 |
| 2:10 | 5.0 | 0.32 | 320 | — |
| 2:30 | 5.0 | 0.32 | 320 | 99 |
| 2:40 | 5.0 | 0.32 | 320 | 80 |

*6.5 weight percent peroctoate in odorless mineral spirits.
**determined by ASTM D-1238 modification of Condition E, g./10 minutes at 190° C.

Scheduling problems forced the termination of this large-scale experiment before equilibrium conditions were obtained between polymer MI and the crosslinking generated at the 320 ppm peroxide level. Due to time lags in the process which are related to gradual purging of earlier product from the second separator and melt cutter, one to two hours operation are generally required to reach steady state conditions. After only 30 minutes operation at 320 ppm peroxide feed rate the MI was still going down. Thus the drop in MI reported is only from 140 down to 80 rather than to the target of 70 MI or less.

Bench scale experiments using t-butyl peroctoate, t-butyl peracetate and other initiators carried in solvents other than wax have shown MI reductions from 18 down to 4, from 310 down to 118, from 28 down to 2.2, etc., so there is no question but that an added hour's operation in the plant unit at a level of 320 to 640 ppm would have given a product with an MI of less than 70.

The reduced MI product of this plant trial was extruded into film and was rated as not significantly different in gel content from that of the higher MI base polymer. The gel level in the base polymer was very low and both it and the mildly crosslinked polymer from this experiment were rated as optically acceptable for film and coating applications.

We claim:

1. In a continuous, high-pressure, free radical polymerization process for preparing ethylene copolymers having reduced gel content and melt index comprising
   a. introducing ethylene and at least one monomer selected from the group consisting of vinyl esters of $C_1$ to $C_4$ monobasic aliphatic acids, acrylates and methacrylates wherein the alcohol moiety is derived from aliphatic $C_1$ to $C_4$ monohydroxy alcohols, acrylic acid, methacrylic acid, maleic acid, and maleic anhydride, provided that at least 75 mol % of the monomers is ethylene and sufficient amount of said vinyl ester, acrylate or methacrylate monomer is introduced to yield at least about 5 weight % of units derived from said monomer in the resulting copolymer, and an initiator into the reactor,
   b. maintaining said monomers and initiator in contact in said reactor at a temperature of about 100° C.–250° C. and a pressure of about 1000–2500 atmospheres until the desired extent of conversion to ethylene copolymers has been obtained,
   c. removing the reaction mixture from said reactor,
   d. reducing the pressure by first pressure let-down means such that the reaction mixture enters a first separator at about 100–400 atmospheres,
   e. separating out from said reaction mixture in said first separator about 90–97% of the unreacted monomers,
   f. further reducing the pressure by second pressure let-down means such that the reaction mixture enters a second separator at about 0–5 atmospheres above ambient, and
   g. separating out from said reaction mixture in said second separator substantially all of the remaining about 3–10% by weight of unreacted monomers,
the improvement in said process comprising the in-line addition of a solution of a free radical initiator in a suitable solvent which is soluble in the copolymer and is not harmful to the crosslinking reaction to said ethylene copolymer reaction mixture after the pressure has been reduced to below about 250 atmospheres and after at least about 90% by weight, but not more than about 97% by weight, of the unreacted monomers have been separated out from said reaction mixture, thereby producing an at least about 50% reduction in the melt index of said ethylene copolymer.

2. The process of claim 1 wherein said solvent is selected from the group consisting of toluene, mineral spirits, cyclohexane and vinyl acetate.

3. The process of claim 1 wherein the free radical initiator is selected from the group consisting of t-butyl peroctoate, t-butyl peroxyisobutyrate, t-butyl peracetate, t-butyl perbenzoate, 2,5-dimethyl-2,5-bis-(t-butylperoxy) hexane, 2,5-dimethyl-2,5-bis (t-butylperoxy) hexyne-3.

4. The process of claim 3 wherein the ethylene copolymer is selected from the group consisting of ethylene/vinyl ester, ethylene/arcylate and ethylene/methacrylate copolymers.

5. The process of claim 4 wherein the copolymer also contains about 0.01–10% by weight of units derived from at least one monomer selected from the group consisting of acrylic acid, methacrylic acid, maleic acid and maleic anhydride.

6. The process of claim 4 wherein the copolymer is selected from the group consisting of ethylene/vinyl acetate, ethylene/isobutyl acrylate, ethylene/vinyl acetate/methacrylic acid, and ethylene/isobutyl acrylate/methacrylic acid.

7. The process of claim 4 wherein the ethylene copolymer is a terpolymer containing at least about 40% by weight ethylene, up to about 60% by weight vinyl acetate and up to about 30% by weight carbon monoxide.

8. The process of claim 7 wherein the ethylene copolymer contains at least about 40% by weight ethylene, from about 15 to about 45% by weight vinyl acetate and from about 2 to about 25% by weight carbon monoxide.

9. The process of claim 4 wherein a sufficient amount of said vinyl ester, acrylate or methacrylate monomer is introduced to yield about 30–50 weight percent of units derived from said monomer in the resulting copolymer.

10. The process of claim 4 wherein a sufficient amount of said vinyl ester, acrylate or methacrylate monomer is introduced to yield about 5–35 weight percent of units derived from said monomer in the resulting copolymer.

11. The process of claim 1 wherein at least about 0.25% of solvent, based upon the weight of the copolymer, is introduced into the reaction mixture.

12. The process of claim 11 wherein at least about 1% of solvent, based upon the weight of the copolymer, is introduced into the reaction mixture.

13. The process of claim 12 wherein about 5 to 20% of solvent, based upon the weight of the copolymer, is introduced into the reaction mixture.

14. The process of claim 1 wherein the hold-up time in the second separator is at least about five times the half-life of the free radical initiator at the temperature of the reaction mixture in the second separator.

* * * * *